United States Patent
Makowski et al.

(10) Patent No.: US 10,747,686 B2
(45) Date of Patent: Aug. 18, 2020

(54) METHOD AND SYSTEM FOR CO-PRIVILEGED SECURITY DOMAINS

(71) Applicant: Narf Industries, LLC, San Francisco, CA (US)

(72) Inventors: Paul E. Makowski, San Diego, CA (US); Benjamin L. Schmidt, San Diego, CA (US); Maxwell J. Koo, Tampa, FL (US)

(73) Assignee: NARF INDUSTRIES, LLC, San Francisco, CA (US)

( * ) Notice: Subject to any disclaimer, the term of this patent is extended or adjusted under 35 U.S.C. 154(b) by 0 days.

(21) Appl. No.: 15/857,118

(22) Filed: Dec. 28, 2017

(65) Prior Publication Data
US 2018/0181498 A1    Jun. 28, 2018

Related U.S. Application Data

(60) Provisional application No. 62/439,821, filed on Dec. 28, 2016.

(51) Int. Cl.
| | | |
|---|---|---|
| G06F 12/14 | (2006.01) | |
| G06F 21/78 | (2013.01) | |
| G06F 21/51 | (2013.01) | |
| G06F 21/74 | (2013.01) | |
| G06F 12/1009 | (2016.01) | |
| G06F 21/57 | (2013.01) | |

(52) U.S. Cl.
CPC .......... *G06F 12/14* (2013.01); *G06F 12/1009* (2013.01); *G06F 12/1416* (2013.01); *G06F 21/51* (2013.01); *G06F 21/575* (2013.01); *G06F 21/74* (2013.01); *G06F 21/78* (2013.01); *G06F 2212/1052* (2013.01)

(58) Field of Classification Search
None
See application file for complete search history.

(56) References Cited

U.S. PATENT DOCUMENTS

| 2016/0283409 A1* | 9/2016 | Pandey .................. G06F 21/57 |
| 2016/0364341 A1* | 12/2016 | Banginwar ........... G06F 12/145 |

OTHER PUBLICATIONS

Crane et al., Readactor: Practical Code Randomization Resilient to Memory Disclosure, IEEE, 18 pages (Year: 2015).*
"Int'l Application Serial No. PCT/US17/068737, Notification of Transmittal of Int'l Search Report and Written Opinion dated May 17, 2018", 7 pgs.

* cited by examiner

*Primary Examiner* — Gary W. Cygiel
(74) *Attorney, Agent, or Firm* — Kwan & Olynick LLP

(57) ABSTRACT

A system and method is provided for secure establishment of a trusted enclave among co-privileged executable code. The system comprises one or more processors; execute only memory; and one or more programs stored in the memory. The one or more programs comprise instructions to establish a trusted enclave and an untrusted enclave in kernel space code, wherein the trusted enclave and the untrusted enclave are co-privileged from the perspective of the processor. The trusted code has the ability to modify page tables and the untrusted code does not have the ability to modify page tables. Any changes to memory mappings involve the trusted code. Page tables are mapped as read-only during execution of the untrusted code and mapped as writeable only during execution of the trusted code.

20 Claims, 6 Drawing Sheets

METHOD AND SYSTEM FOR CO-PRIVILEGED SECURITY DOMAINS

CROSS-REFERENCE TO RELATED APPLICATIONS

This application claims priority under 35 U.S.C. § 119 to Provisional U.S. Patent Application No. 62/439,821 by Makowski et al., filed on Dec. 28, 2016, titled "Method and System for Co-Privileged Security Domains," which is incorporated by reference herein in its entirety and for all purposes.

TECHNICAL FIELD

The disclosed embodiments relate generally to computer systems and security domains.

BACKGROUND

Computer systems and programs contain vulnerabilities. A common metric is the number of bugs over lines of code (LOC). The more complex the software, the more opportunity for vulnerabilities. Because smart phones and computers are becoming ever more complex, technology systems are becoming more and more vulnerable. One major problem that faces technology today is the level of security due to the level of privilege for certain calls and functions. Traditionally, the kernel space was the highest level of privilege in a computer system. However, many applications today require a level of privilege higher than the kernel space can provide in order to provide better security. Solutions to this have been to provide more improved and modern hardware upgrades or implementing optional CPU/hardware extensions, which provide computer systems with separate hardware security domains. However, buying new devices is costly and retrofitting old devices with new hardware can be just as costly, if not more. There is no current solution for older devices to enjoy separate security domains without additional hardware. Thus, there is a need for a mechanism for the secure establishment of an additional security domain within kernel-space without the use of optional CPU/hardware extensions.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are configured machine systems, methods, and computer readable media for secure establishment of a trusted enclave among co-privileged executable code. In one aspect of the present disclosure, which may include at least a portion of the subject matter of any of the preceding and/or following examples and aspects, a system comprises a processor and memory. The memory stores one or more programs comprising instructions to establish a trusted enclave and an untrusted enclave in kernel space code, wherein the trusted enclave and the untrusted enclave are co-privileged from the perspective of the processor. The trusted code has the ability to modify page tables and the untrusted code does not have the ability to modify page tables. Any changes to memory mappings involve the trusted code. Page tables are mapped as read-only during execution of the untrusted code and mapped as writeable only during execution of the trusted code.

These and other embodiments are described further below with reference to the figures.

BRIEF DESCRIPTION OF THE DRAWINGS

Like reference numerals refer to corresponding parts throughout the drawings.

DESCRIPTION OF EMBODIMENTS

Figure 1:
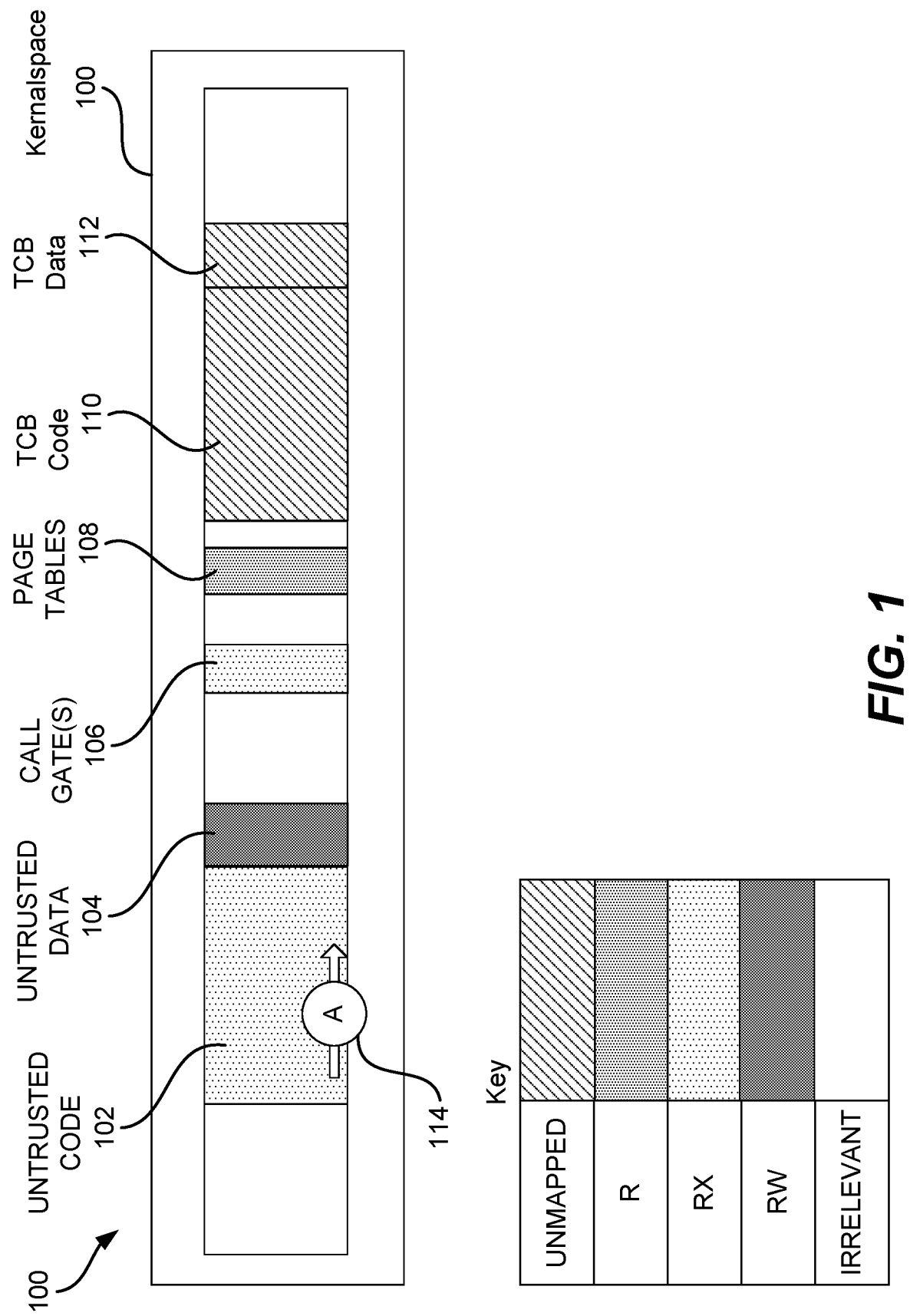
FIG. 1 illustrates one example of memory protection mappings during untrusted code execution, according to various embodiments of the present disclosure.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Methods that enable bug-free software development do not yet exist. Instead, current methods trend toward mitigating vulnerabilities to the greatest degree possible. Specifically, today's most trustworthy software utilizes Trusted Code Bases (TCBs). TCBs are small code segments that are tasked with performing privileged or potentially dangerous actions on the users' behalf. These TCBs mediate requests from more complex code. The theory is that TCBs can be sufficiently small so as to be amenable to manual audit and formal proofs, reducing the likelihood of TCB vulnerability. These TCBs filter requests from the untrusted code, choosing to whether to perform privileged actions based on some policy.

TCB theory underlies static roots of trust as seen on modern smartphones, tablets, workstations and servers as well as dynamic roots of trust enabled by products such as Intel SGX. In many cases, it forms the basis for today's cutting edge operating system. The theory has also been applied in user-space contexts.

Historically, the operating system kernel was the sole arbiter for access controls, enforcing Discretionary Access Controls (DACs) such as classical filesystem permission checks as well as Mandatory Access Controls (MACs) such as those enforced by SELinux. Kernels were essentially massively complex programs that are ultimately trusted. However, this situation is potentially toxic in the context of TCB theory.

Modern operating systems extend this model in both directions: hardware modes that are more privileged than kernel mode have been introduced and user-space applications have begun practicing privilege separation as a defense-in-depth measure.

Unfortunately, more-privileged-than-kernel modes have heretofore been offered as optional (and costly) CPU extensions (hardware extensions). Technologies such as hypervisor extensions (e.g. Intel's VMX) and ARM's TrustZone have added to the number of effective privilege levels. Software on newer devices has begun to take advantage of these extensions, but already-fielded devices (e.g., older, non-hardware extended devices) and low cost future devices will not provide the requisite support.

Overview

In various embodiments, a system and method for secure establishment of a trusted enclave among co-privileged executable code is provided. In one embodiment, this trusted enclave provides a security boundary between trusted and untrusted kernel-space code. These code segments are co-privileged from the perspective of the CPU, but nevertheless are afforded differing levels of capability.

In some embodiments, at a high level, the system utilizes the CPU's Memory Protection Unit (MPU) or Memory Management Unit (MMU) to swap memory permissions in a manner that disadvantages untrusted logic relative to the trusted logic. MMUs are common in application processors (APs) found in mobile devices, workstation, servers, etc. MPUs are common in embedded, low-power, low-cost devices. In some embodiments, the system is applicable to both.

In some embodiments, the system deprivileges untrusted code by removing its ability to modify page tables. Any change in memory mappings must therefore involve the TCB, which can mediate such requests. In order to achieve this, the page tables must be mapped as read-only while executing untrusted code and writable while executing the TCB.

In various embodiments, the present disclosure provides a method and system for secure, software-only isolation between co-privileged trusted (TCB) and untrusted logic. The system can be used to defeat code injection attacks. The system forces attackers to conduct all malicious logic through the reuse of existing code snippets (e.g. via ROP, JOP, SROP, etc) or to exploit the trusted TCB directly. Both options increase attack cost. In some embodiments, the system can be used to defeat denial of service attacks that attempt to allocate excessive memory. In some embodiments, the system can be used to implement a trusted enclave for secret storage, such as cryptographic (e.g. DRM) keys, biometrics (e.g. fingerprints), and etc. In some embodiments, the system can be used to implement any task commonly deferred to a higher privilege level, e.g. TrustZone on ARM devices or VMX on Intel/AMD-powered workstations. In some embodiments, the system provides a platform for innovative security designs without optional, costly CPU extensions. The above tasks can be implemented using the system at less cost and offer more widespread applicability than existing systems. In addition, the methods provided by the present disclosure actually improve the computer function itself. Standard or generic computers would be vulnerable to multiple types of security attacks or vulnerability exploits. However, using the methods and systems of the present disclosure, the computers significantly reduce the exposure and chances of being attached or exploited.

Detailed Embodiments

Figure 2:
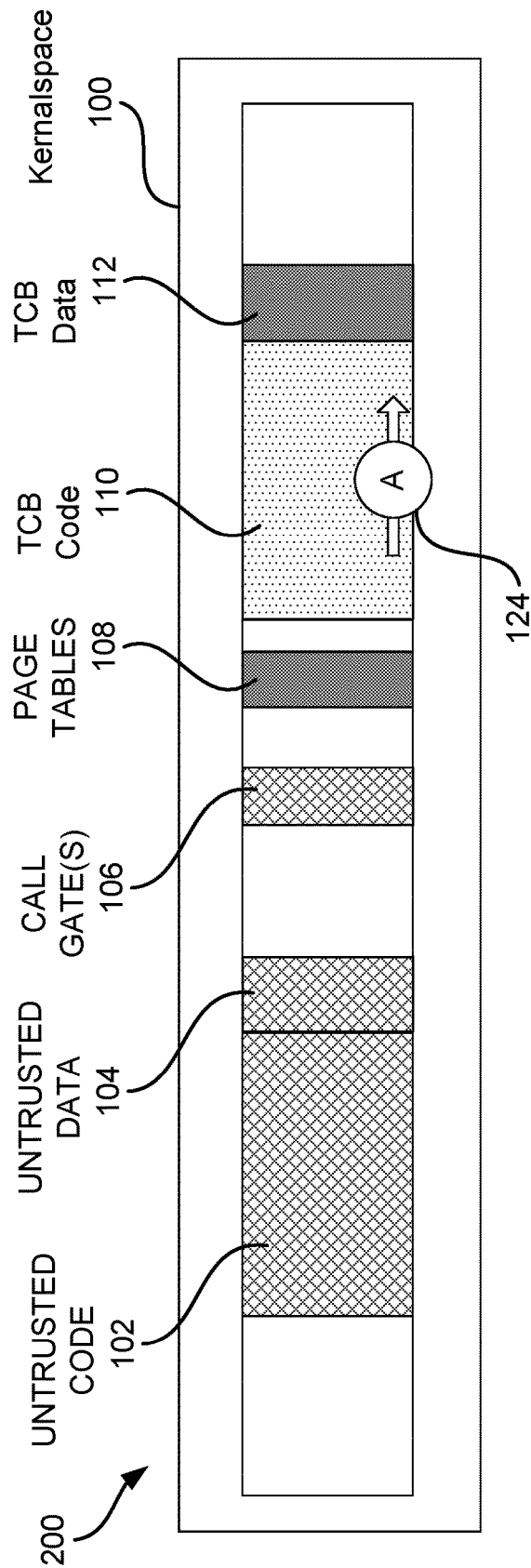
FIG. 2 illustrates one example of memory protection mappings during trusted code execution, according to various embodiments of the present disclosure.
Figure 3:
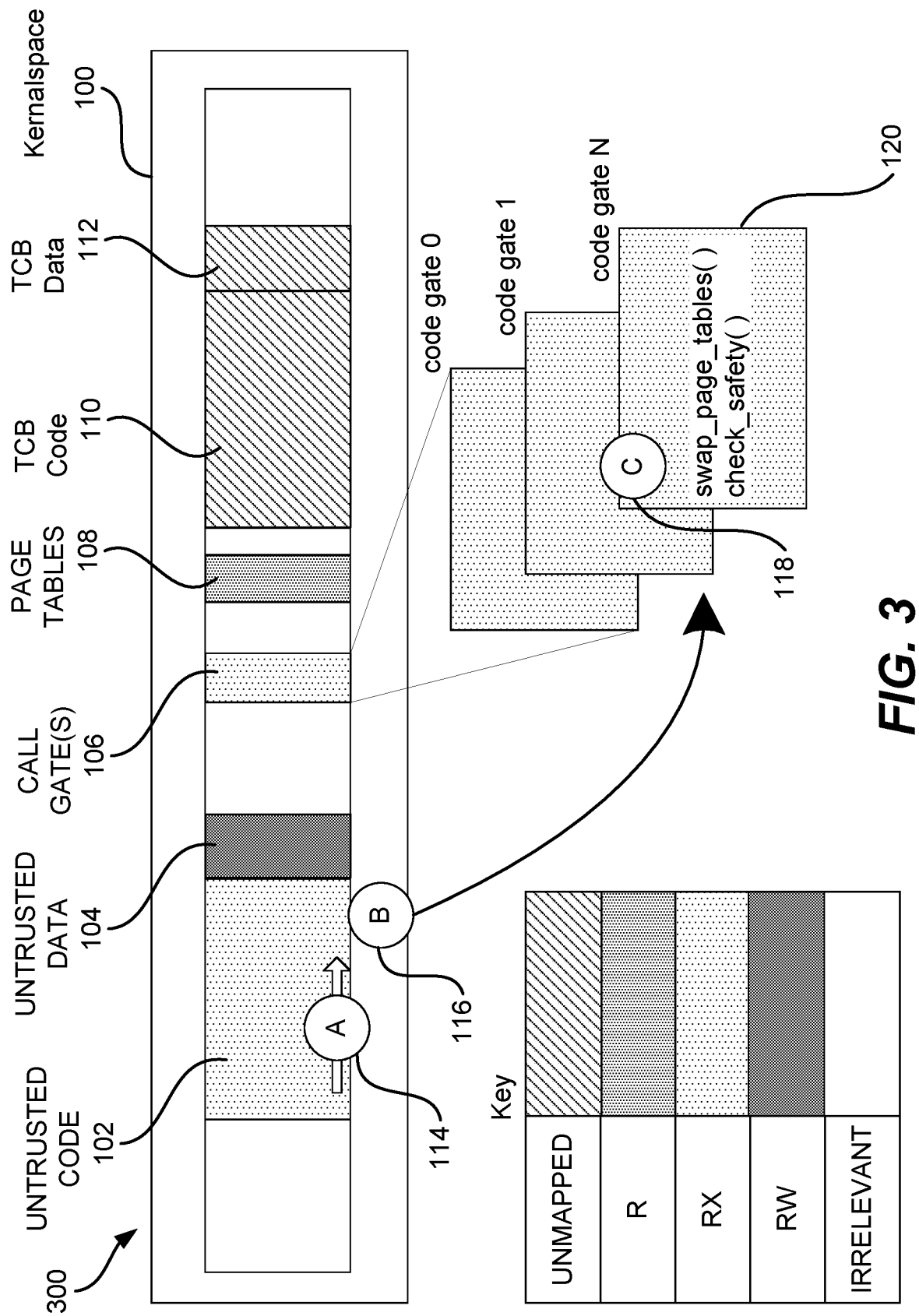
FIG. 3 illustrates one example of a first half of a call gate transition, according to various embodiments of the present disclosure.
Figure 4:
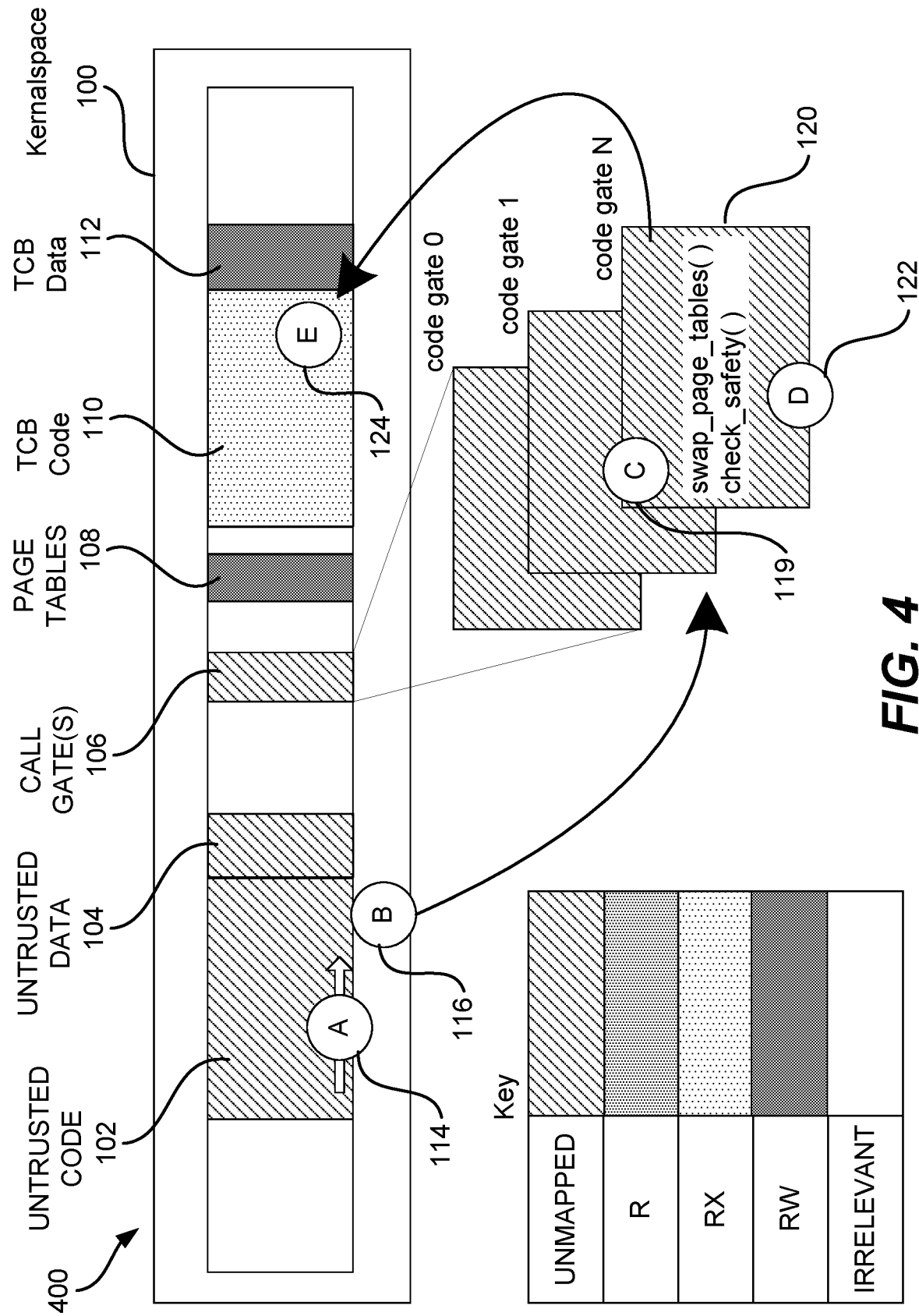
FIG. 4 illustrates one example of a second half of a call gate transition, according to various embodiments of the present disclosure.

FIG. 1 illustrates one example of memory protection mappings (100) during untrusted code execution, according to various embodiments of the present disclosure. FIG. 2 illustrates one example of memory protection mappings (200) during trusted code execution, according to various embodiments of the present disclosure. FIGS. 3 and 4 illustrate how untrusted code executions are handled to bring them into trusted code. As shown in the two figures, trusted and untrusted code operate in different sections in kernel space. FIGS. 1-4 all contain kernel space 100. Each kernel space 100 includes untrusted code 102, untrusted data 104, call gate(s) 106, page tables 108, trusted (TCB) code 110, and trusted (TCB) data 112. In addition, some of the figures contain untrusted code execution 114 and/or trusted code execution 124, as well as code gate(s) 120. FIGS. 3 and 4 additionally contain intermediate code execution steps 116, 118, 119 and 122, as described later in the application.

As shown in the figures, memory permissions of different components of kernel space change when executing trusted and untrusted code, as evidenced by the keys in each of the figures. For example, in FIG. 1, untrusted code 102 and call gate(s) 106 are both Read/eXecute (RX) permissions, untrusted data 104 is Read/Write (RW) permission, page table 108 is Read (R) permission, and both TCB code 110 and TCB data 112 are unmapped. However, in FIG. 2, untrusted code 102 and call gate(s) 106 are now both TCB defined permissions, untrusted data 104 is also TCB defined permission, page table 108 and TCB data are Read/Write (RW) permission, and TCB code 110 is Read/eXecute (RX) permission. In some embodiments, TCB defined permission means whatever the TCB needs to be done. For example, if the TCB needs the untrusted data 104 to be R, then it will be R.

Example Embodiment

The following example provides just one example embodiment for describing aspects of the methods and systems described in the present disclosure. In various embodiments, the system involves the following system components:
  a CPU architecture that supports either an MPU or an MMU;
  a mechanism to execute short, sequential snippets of unmapped memory; methods to achieve this on commodity x86 and ARM CPUs are detailed in a later section;
  untrusted code & data: complex logic handling all tasks but memory management.
  a TCB (trusted code basis) responsible for managing memory protections and enforcing policy; and
  a memory protection policy.

In order to implement the example system presented above, an example life cycle is presented. First, a software developer produces untrusted and trusted code segments with the following properties:
  Trusted: A minimal TCB that mediates all memory protection changes and enforces a memory protection policy after the device is booted before untrusted input is processed.
  Untrusted: Everything that isn't in the TCB. Most importantly, all logic that deals with potentially malicious input is handled by untrusted code.

Next, the system-enabled device is powered on. During the boot process, the TCB is permissive, meaning it does not enforce its memory protection scheme. This allows the untrusted code to map everything necessary to bootstrap the system as it normally would without incurring performance cost. At some point, the boot process has completed. The untrusted code informs the trusted code of this fact and the trusted code switches from permissive to enforcing mode. At runtime, the untrusted code may need to allocate or deallocate memory. Because the untrusted code cannot unilaterally modify the read-only page tables and it lacks the instructions necessary to reconfigure the MPU/MPU, such requests are mediated by the TCB, which enforces policy.

Example Untrusted Code Instruction Restrictions

In various embodiments, there are several classes of banned instructions that must not exist in untrusted code. In some embodiments, the untrusted region must not contain any eXecutable instructions that can be used to reconfigure the MMU/MPU. For example, if the system were applied to the ARM architecture, MCR instructions that write to coprocessor register 15 would require scrutiny.

In some embodiments, the untrusted region must not have the ability to interrupt sequential instruction execution (cause out-of-order execution), e.g. by configuring the CPU to single-step and redirecting execution to a handler function after each instruction. This also means the untrusted region must not be capable of configuring interrupt handlers. In an example embodiment, the system may be implemented on the x86 platform. In such an implementation, untrusted code must not contain LIDT instructions.

Example Minimum System Policy Requirements

In various embodiments, in addition to the instruction restrictions, secure system memory protection policies must ensure several invariants. In some embodiments, untrusted code must not be permitted to alter TCB code or data in a manner that would enable policy circumvention. Specifically, while executing untrusted code, the MMU/MPU's page tables are mapped as Read-only. While executing untrusted code, the TCB (code and data) must not be Writable. In some embodiments, the TCB code and data simply isn't mapped at all, as shown in FIG. 1.

In some embodiments, untrusted code must not be permitted to introduce untrusted executable code at runtime, as such introduction could be used to violate the restrictions placed on untrusted instructions previously enumerated. Untrusted code is permitted, however, to request additional executable mappings from the TCB. The TCB may allow such action when it is capable of trusting the code, e.g. when a code signature and verification scheme is allowed by policy (details later) or may deny the request.

Example Full System Policies

In various embodiments, system designers may choose to augment the minimal policies enumerated above with additional requirements that further lock down their platform. The following are several exemplar policies that have immediate applicability to a wide range of devices.

In some embodiments, the system includes Full Runtime eXecutable Lockdown: following an initial boot period and before processing untrusted input, the TCB forbids any future eXecutable memory mappings. This prevents an entire class of attacks (code injection attacks), but isn't suitable for all devices. Embedded devices that do not require the ability to dynamically load code (e.g. CAN bus devices, centrifuges, many RTOSes, etc) would do well to enable this. In such embodiments, the policy specifics include the requirement that memory must never be simultaneously eXecutable and Writable (WAX), and writable memory is "dirty" and cannot later be made eXecutable except when a cleansing procedure may be defined, e.g. the TCB offers secure erase functionality that wipes the Writable page and clears its "dirty" bit. In some embodiments, the policy specifics also include the requirement that eXecutable memory cannot be made Writable without first removing the eXecutable permission. In some embodiments, the policy specific include the requirement that Memory cannot be dual mapped in a manner that would enable circumvention of the above restrictions.

In some embodiments, the system also includes Runtime Code Signing Enforcement: following an initial boot period and before processing untrusted input, the TCB forbids any future eXecutable memory mapping that is not accompanied by a valid signature from some trusted authority. This policy is suitable for devices that need to load code at runtime, but can ensure the progeny of all such code (many mobile devices, tablets, some workstations and servers). In some embodiments, the policy specifics include that Memory must never be simultaneously eXecutable and Writable (W^X). The specifics also include that Writable memory is "dirty" and cannot later be made eXecutable except when eXecutable memory has a corresponding valid signature from a trusted authority. An example of this methodology includes the untrusted code loading signed code into memory from, e.g. disk; the untrusted code requesting the TCB to reprotect the code's memory as eXecutable; transitioning Execution from the untrusted code to the TCB; if present, the TCB removing the Writable permission from the candidate memory; the TCB measuring the candidate memory and comparing it against its accompanied signature; if the signature check passes, the TCB flagging the code's memory as eXecutable; and returning Execution to the untrusted code. In some embodiments, a cleansing procedure may be defined. e.g. the TCB offers secure erase functionality that wipes the Writable page and clears its "dirty" bit. In some embodiments, the specifics also include requiring that eXecutable memory cannot be made Writable without first removing the eXecutable permission. In some embodiments, the specifics also require that Memory cannot be dual mapped in a manner that would enable circumvention of the above restrictions.

Example TCB Privilege

In various embodiments, taken together, instruction restrictions placed on untrusted code plus the minimum policy requirements force a system-enabled kernel to mediate all memory protection changes through the TCB. In some embodiments, the TCB has no such restrictions: all instructions are allowed to exist in the TCB and the page tables are mapped as writable during TCB execution.

In some embodiments, the system embodiments employ at least two sets of page tables: (1) the page tables in play during untrusted execution, (2) the page tables in play during TCB execution. In some embodiments, the system includes an extended number of page table sets, e.g. for performance reasons. An example minimal set is provided below.

The first mappings set in the example set is Untrusted page table mappings (100), as shown in FIG. 1. The RX mappings are untrusted code 102 and call gates 106. The RW mappings are untrusted data 104. The R mappings are page tables 108. Everything else is either unmapped or has no access.

The second mappings set in the example set is TCB page table mappings (200), as shown in FIG. 2. The RX mappings are untrusted code 102 and TCB code 110. The RW mappings are TCB data 112 and page tables 108. The R mappings are untrusted data 104 (can also be TCB defined). The rest is unmapped or has no access.

Controlled Untrusted to Trusted Execution Transfers

In various embodiments, removing the untrusted code's ability to manage page tables does not remove its need to do so. Thus, in various embodiments, the untrusted code must retain the ability to request memory protection changes from the TCB in a secure manner. In some embodiments, the solution utilizes call gates, and is illustrated in FIGS. 3 and 4. An example call gate process is provided below.

FIG. 3 illustrates an example first half (300) of a call gate transition. FIG. 4 illustrates an example second half (400) of a call gate transition. In step A, untrusted code starts executing (114). In step B, the untrusted code determines (116) it needs to call into/make a request to the TCB. In some embodiments, untrusted code prepares the request in a manner reminiscent of a function call: it places information concerning the memory protection request into CPU registers, on the stack, etc as is appropriate for the embodiment's architecture and implementation choices. In one example embodiment on ARM devices, untrusted code may request that the page based at 0x40000000 have the Writable permission added. One embodiment may call for untrusted code to place 0x40000000 into R0 and 0x3 into R1, where R0 holds the page address that needs changing and 0x3 holds a bitmap of the requested page permissions.

In step C, execution is transferred (118) by untrusted code to the appropriate call gate (120). In some embodiments, the appropriate call gate 120 is one of multiple code gates N. In this example, the TCB is not mapped whatsoever during untrusted execution. Also in step C, page tables are swapped (119) and the call gate swaps memory permissions causing the TCB to become mapped. It is worth noting that in some embodiments, both transfer of execution (118) and page table swapping (119) occur at step C. In other embodiments, transfer of execution (118) and page table swapping (119) occur in separate steps. It is also worth noting that untrusted code and the call gates are now unmapped (but the latter remains in the instruction cache).

In step D, a post-facto safety check is performed (122) on the new page tables. In some embodiments, this occurs via checking the safety of the swap against a whitelist. In step E, if the safety check passes, execution is transferred (124) to the appropriate entry in the now-mapped TCB code 110. As needed, the TCB will re-map the untrusted code 102 and data 104, as seen in FIG. 2. In some embodiments, the TCB enforces policy by permitting or denying the initial request of untrusted code. In some embodiments, the TCB also utilizes a return page swap followed by a return to the calling untrusted code.

In some embodiments, the TCB is not mapped whatsoever during untrusted execution (see FIG. 3). However, in such embodiments, this presents a challenge: How does untrusted code make requests and transfer execution to the TCB? In some embodiments, one solution is to use carefully constructed call gates. In some embodiments, controlling gates or entry points from less-trusted to more-trusted code (the TCB) is a necessary part of any security boundary design.

In some embodiments, TCB call gates are the only locations in untrusted memory that are permitted to contain instructions that reconfigure MMU/MPU. In some embodiments, untrusted code calls through these gates to cause the TCB to become mapped and then transfers execution control to the TCB.

In some embodiments, the system also ensures that the dangerous MPU/MMU reconfiguring instructions in call gates cannot be abused to circumvent the system, e.g. by causing the page tables or the TCB to be reprotected as writeable during untrusted code execution. In such embodiments, the call gates also implement safety checks.

Example Call Gate

The following is an example call gate for the ARM architecture:

; untrusted code places a new page table base address in r0
mcr p15, 0, r0, c2, c0, 0; change page table base address to [r0]
CMP r0, #0xAAAA; post-facto safety check: compare the new base
; address against 0xAAAA, a known good
BNE panic; if the check fails, panic the system
B TCB_entry_point; otherwise, branch to the now-mapped TCB Example Attack: Unmapping Call Gates An example attack is described below. In various embodiments, the call gates are only mapped during untrusted execution. In such embodiments, this means that a malicious actor may cause the call gates to become unmapped by passing malicious page tables to the exemplar MCR instruction above. These malicious page tables may seek to flag the remainder of the call gate instruction sequence as unmapped or non-eXecutable. An attacker may do this in an attempt to cause the safety checks to fail.

Thus, in some embodiments, the system addresses this concern by exploiting CPU behavior regarding cached instructions and disallowing the registration and the handling of interrupts in untrusted space.

In various embodiments, ubiquitous architectures (likely targets for the system embodiments) can be configured to not evict instructions from the instruction cache following a page table change. For example, on x86, the base address of the page tables is stored in the upper 20 bits of CR3. A write to these bits results in a flush of all cache lines except those that point to "global" pages. A secure system embodiment on x86 platforms would mark call gate pages as "global." In another example, on ARM, the MCR instruction is responsible for reconfiguring the base address of the page tables. ARM cores do not automatically flush the instruction cache after a page table change. Such logic is left to software. A secure system embodiment on ARM platforms will defer such a flush until execution has been transferred to the TCB.

In various embodiments, secure system embodiments will retain all the call gate instructions in their instruction cache. An attacker that attempts to evade the post-facto safety checks by unmapping will therefore be disappointed. As used herein, "secure" system embodiments refer to systems that implement enough features as disclosed herein to guard and prevent exploitation of all the vulnerabilities and drawbacks specifically explained in the present disclosure.

Example Interrupt Handlers

In some embodiments, secure embodiments of present disclosure will disallow untrusted registration and handling of interrupts. If untrusted code were permitted to handle interrupts, an attacker could achieve untrusted modification of the TCB by configuring the CPU for single-step mode as a means to achieve out-of-order execution. An attacker may enable single-step mode, begin executing a call gate with malicious arguments and then bypass the post-facto safety checks by redirecting execution. In addition, the attacker may also be able to force the TCB to generate an interrupt that is then handled by untrusted code. Upon receiving the interrupt, the untrusted code will be executing within the context of the TCB page tables, permitting arbitrary memory modifications from untrusted code.

In various embodiments, means to prevent untrusted registration and handling of interrupts is architecture—and therefore embodiment—specific. For example, on x86, the system designers must be careful to not include the LIDT instruction in the untrusted space as this instruction could be used to reconfigure the location of the interrupt handlers.

In some embodiments, because the TCB is ideally not mapped during untrusted execution, any interrupt that occurs during untrusted execution cannot be directly handled by the TCB. Instead, the system calls for call gates dedicated to interrupt handlers.

In one example, the system might register a different handler for each type of interrupt. Each handler would be a different call gate that would transition to the appropriate handling logic in the TCB.

Figure 5:
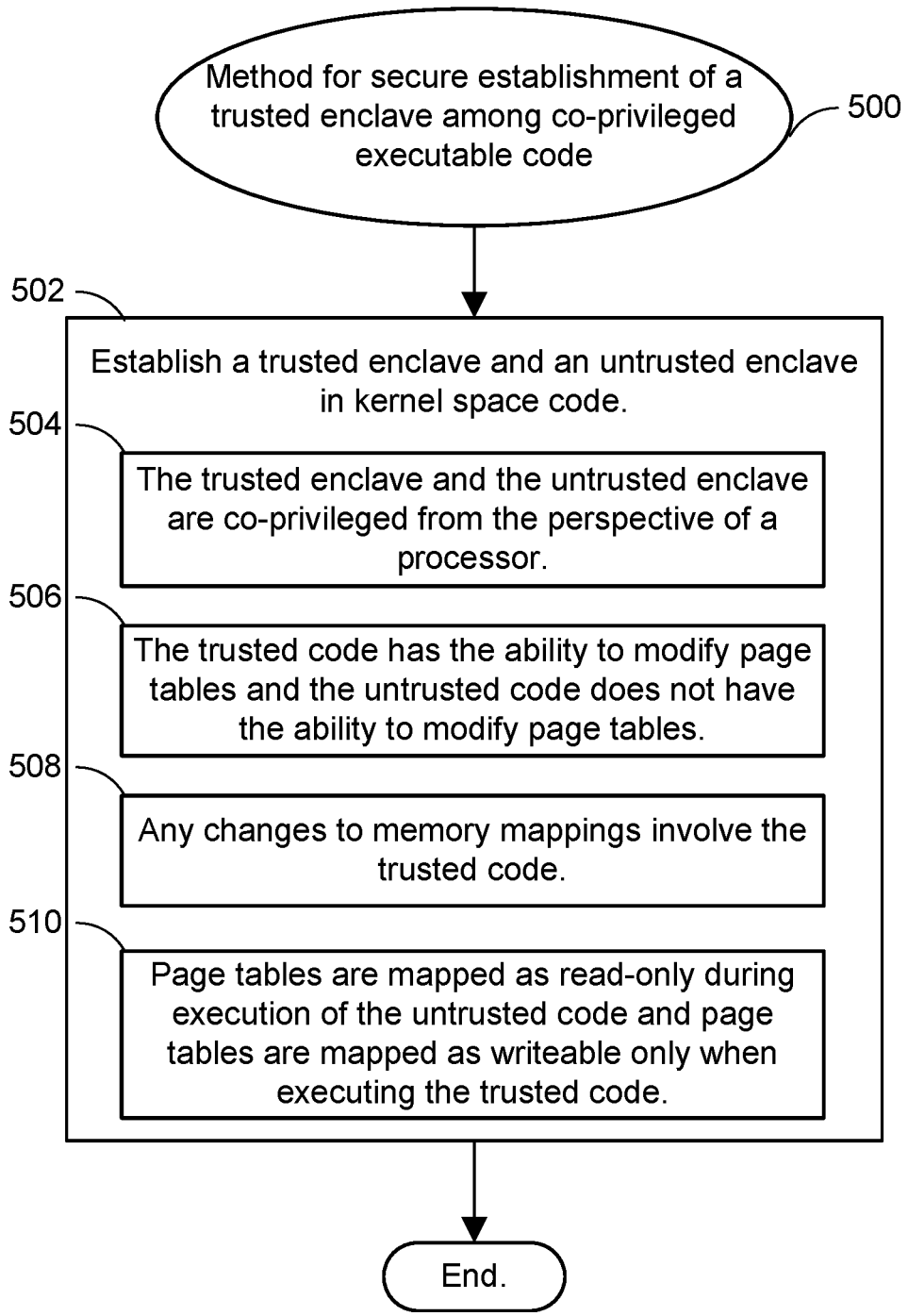
FIG. 5 illustrates a method for secure establishment of a trusted enclave among co-privileged executable code, according to various embodiments of the present disclosure.

FIG. 5 illustrates a method 500 for secure establishment of a trusted enclave among co-privileged executable code, according to various embodiments of the present disclosure. Method 500 includes establishing (502) a trusted enclave and an untrusted enclave in kernel space code. In some embodiments, the trusted enclave and the untrusted enclave are (504) co-privileged from the perspective of a processor. In some embodiments, the trusted code has (506) the ability to modify page tables and the untrusted code does not have the ability to modify page tables. In some embodiments, any changes to memory mappings involve (508) the trusted code. In some embodiments, page tables are mapped (510) as read-only during execution of the untrusted code and page tables are mapped as writeable only when executing the trusted code.

In some embodiments, the processor is configured for executing short sequential snippets of unmapped memory. In some embodiments, the trusted code is a trusted code basis. In some embodiments, the trusted code mediates all protection changes and enforces a memory protection policy after the device is booted before untrusted input is processed. In some embodiments, all logic that deals with potentially malicious input is handled by untrusted code. In some embodiments, during the boot process, the trusted code is permissive and allows untrusted code to map necessary data for bootstrapping the system. In some embodiments, after the boot process, the untrusted code signals the trusted code to switch from permissive to enforcement mode. In some embodiments, during runtime, the untrusted code can only allocate or deallocate memory by mediating requests through the trusted code. In some embodiments, the untrusted code does not contain any executable code that can modify a memory protection unit or a memory management unit.

Figure 6:
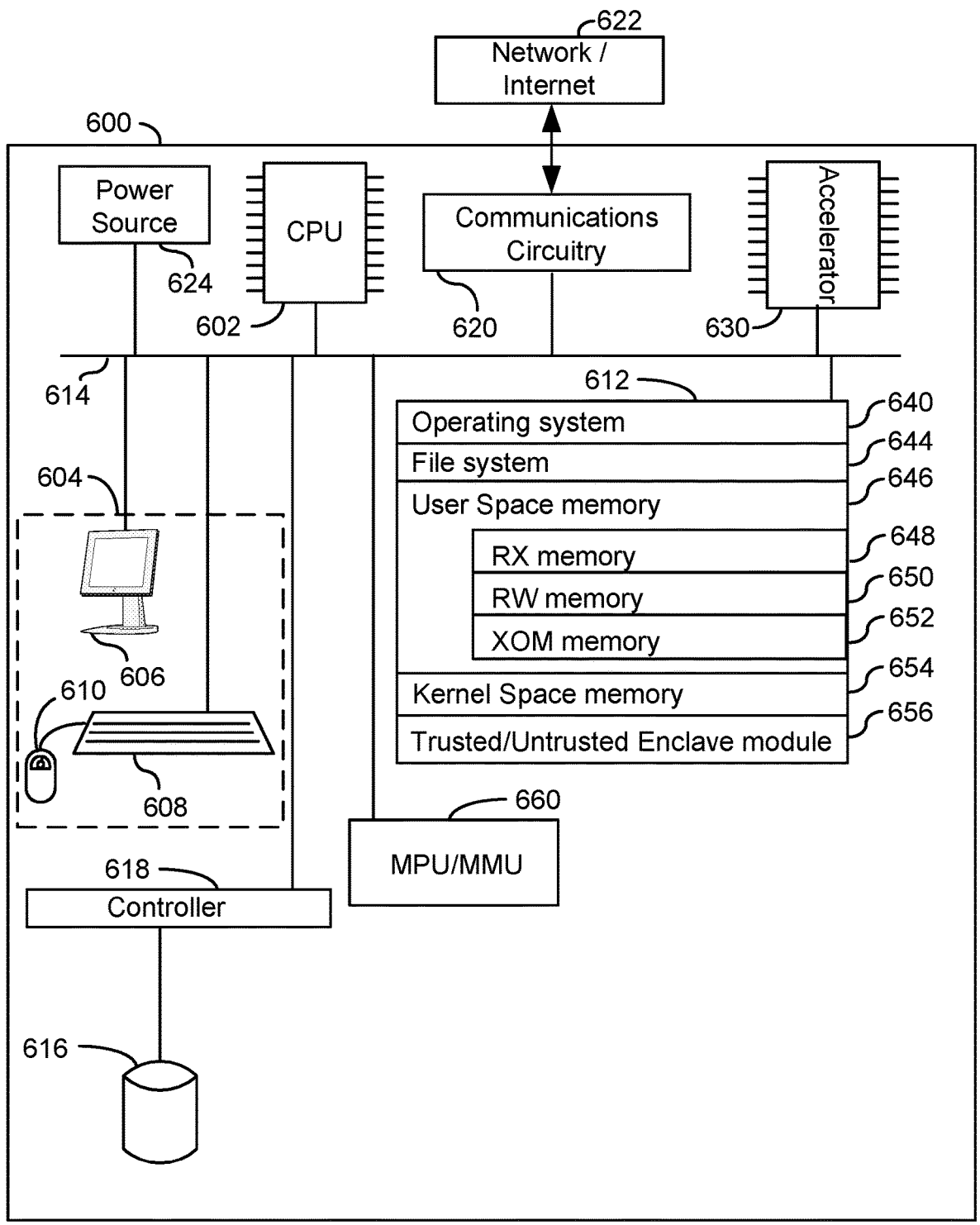
FIG. 6 is a block diagram illustrating an example of a computer system capable of implementing various processes described in the present disclosure.

FIG. 6 is a block diagram illustrating an example of a computer system capable of implementing various processes described in the present disclosure. The system 600 typically includes a power source 624; one or more processing units (CPU's) 602 for executing modules, programs and/or instructions stored in memory 612 and thereby performing processing operations; one or more network or other communications circuitry or interfaces 620 for communicating with a network 622; controller 618; and one or more communication buses 614 for interconnecting these components. In some embodiments, network 622 can be the another communication bus, the Internet, an Ethernet, an Intranet, other wide area networks, local area networks, and metropolitan area networks. Communication buses 614 optionally include circuitry (sometimes called a chipset) that interconnects and controls communications between system components. System 600 optionally includes a user interface 604 comprising a display device 606, a keyboard 608, and a mouse 610. Memory 612 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 612 may optionally include one or more storage devices 616 remotely located from the CPU(s) 602. Memory 612, or alternately the non-volatile memory device(s) within memory 612, comprises a non-transitory computer readable storage medium. In some embodiments, system 600 includes an MPU or MMU 660. In some embodiments, memory 612, or the computer readable storage medium of memory 612 stores the following programs, modules and data structures, or a subset thereof:

- an operating system 640 that includes procedures for handling various basic system services and for performing hardware dependent tasks;
- a file system 644 for storing various program files;
- user space memory 646 for executing applications;
- kernel space memory 654 for executing system calls; and
- a trusted/untrusted enclave module for establishing a trusted enclave and an untrusted enclave in kernel space code, wherein the trusted enclave and the untrusted enclave are co-privileged from the perspective of the processor 602.

User space memory 646 may include the following portions of memory, or a subset thereof:
RX memory 648 for storing readable and executable segments of code;
RW memory 650 for storing readable and writeable segments of code; and
XOM memory 652 for storing execute only segments of code.

Any of the modules mentioned above may also include submodules. Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 612 may store a subset of the modules and data structures identified above. Furthermore, memory 612 may store additional modules and data structures not described above. In some embodiments, system 600 may even include an accelerator 630 to help carry out processing for any of its functions.

Although FIG. 6 shows one example of a computer system, FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement a system and how features are allocated among them will vary from one implementation to another, and may depend in part on the amount of data traffic that the system must handle during peak usage periods as well as during average usage periods.

As provided herein, the systems and methods disclosed provide significant benefits and advantages. For example, the system provides a security boundary between less-trusted (e.g. kernel) and more-trusted (e.g. TCB) execution without the explicit aid of CPU hardware. In addition, some embodiments of the present disclosure provide a software-only solution where previously only hardware-enabled solutions existed. Such a design reduces hardware cost and increases systems' applicability to already fielded devices.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A system for secure establishment of a trusted enclave among co-privileged executable code, comprising:
a processor;
memory; and
one or more programs stored in the memory, the one or more programs comprising instructions to:
establish a trusted enclave and an untrusted enclave in kernel space code, wherein the trusted enclave and the untrusted enclave are co-privileged from the perspective of the processor, wherein establishing the trusted and untrusted enclave does not require a privilege level above kernel space,
wherein handling of interrupts is disallowed in the untrusted enclave,
wherein the trusted code has the ability to modify page tables and the untrusted code does not have the ability to modify page tables,
wherein any changes to memory mappings involve the trusted code, and
wherein page tables are mapped as read-only during execution of the untrusted code and page tables are mapped as writeable only when executing the trusted code.

2. The system of claim 1, further comprising a memory protection unit or a memory management unit.

3. The system of claim 1, wherein the processor is configured for executing short sequential snippets of unmapped memory.

4. The system of claim 1, wherein the trusted code is a trusted code basis.

5. The system of claim 1, wherein the trusted code mediates all protection changes and enforces a memory protection policy after the device is booted before untrusted input is processed.

6. The system of claim 1, wherein all logic that deals with potentially malicious input is handled by untrusted code.

7. The system of claim 1, wherein during the boot process, the trusted code is permissive and allows untrusted code to map necessary data for bootstrapping the system.

8. The system of claim 7, wherein after the boot process, the untrusted code signals the trusted code to switch from permissive to enforcement mode.

9. The system of claim 1, wherein during runtime, the untrusted code can only allocate or deallocate memory by mediating requests through the trusted code.

10. The system of claim 1, wherein the untrusted code does not contain any executable code that can modify a memory protection unit or a memory management unit.

11. A method for secure establishment of a trusted enclave among co-privileged executable code, comprising:
establishing a trusted enclave and an untrusted enclave in kernel space, wherein the trusted enclave and the untrusted enclave are co- privileged from the perspective of a processor, wherein establishing the trusted and untrusted enclave does not require a privilege level above kernel space,
wherein handling of interrupts is disallowed in the untrusted enclave,
wherein the trusted code has the ability to modify page tables and the untrusted code does not have the ability to modify page tables,
wherein any changes to memory mappings involve the trusted code, and
wherein page tables are mapped as read-only during execution of the untrusted code and page tables are mapped as writeable only when executing the trusted code.

12. The method of claim 11, wherein the processor is configured for executing short sequential snippets of unmapped memory.

13. The method of claim 11, wherein the trusted code is a trusted code basis.

14. The method of claim 11, wherein the trusted code mediates all protection changes and enforces a memory protection policy after the device is booted before untrusted input is processed.

15. The method of claim 11, wherein all logic that deals with potentially malicious input is handled by untrusted code.

16. The method of claim 11, wherein during the boot process, the trusted code is permissive and allows untrusted code to map necessary data for bootstrapping the system.

17. The method of claim 16, wherein after the boot process, the untrusted code signals the trusted code to switch from permissive to enforcement mode.

18. The method of claim 11, wherein during runtime, the untrusted code can only allocate or deallocate memory by mediating requests through the trusted code.

19. The method of claim 11, wherein the untrusted code does not contain any executable code that can modify a memory protection unit or a memory management unit.

20. A non-transitory computer readable storage medium storing one or more programs configured for execution by a computer, the one or more programs comprising instructions to:
- establish a trusted enclave and an untrusted enclave in kernel space, wherein the trusted enclave and the untrusted enclave are co-privileged from the perspective of the processor, wherein establishing the trusted and untrusted enclave does not require a privilege level above kernel space,
- wherein handling of interrupts is disallowed in the untrusted enclave,
- wherein the trusted code has the ability to modify page tables and the untrusted code does not have the ability to modify page tables,
- wherein any changes to memory mappings involve the trusted code, and
- wherein page tables are mapped as read-only during execution of the untrusted code and page tables are mapped as writeable only when executing the trusted code.

* * * * *